Figure 1:
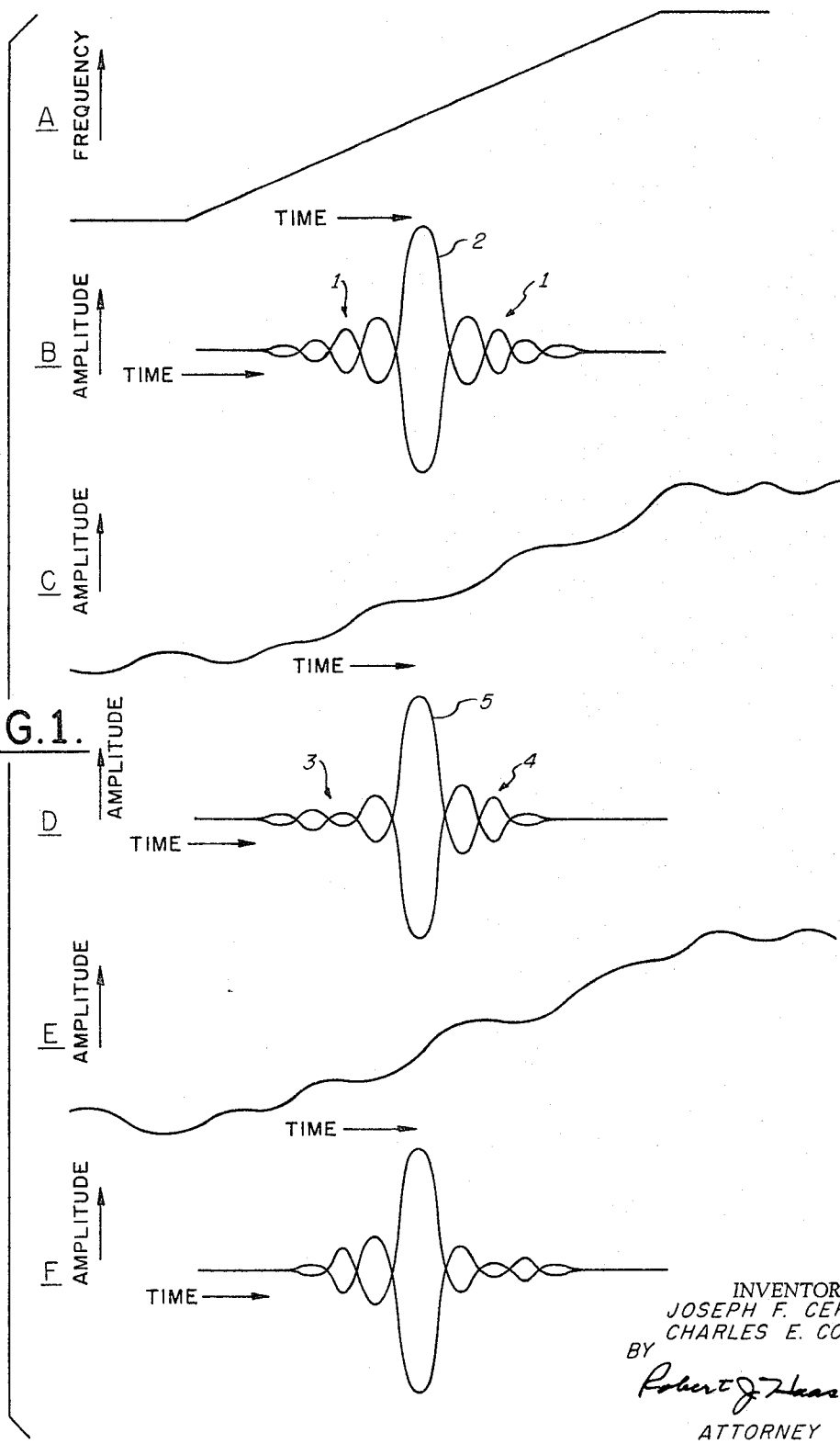

INVENTORS
JOSEPH F. CERAR
CHARLES E. COOK
BY
Robert J Haase
ATTORNEY

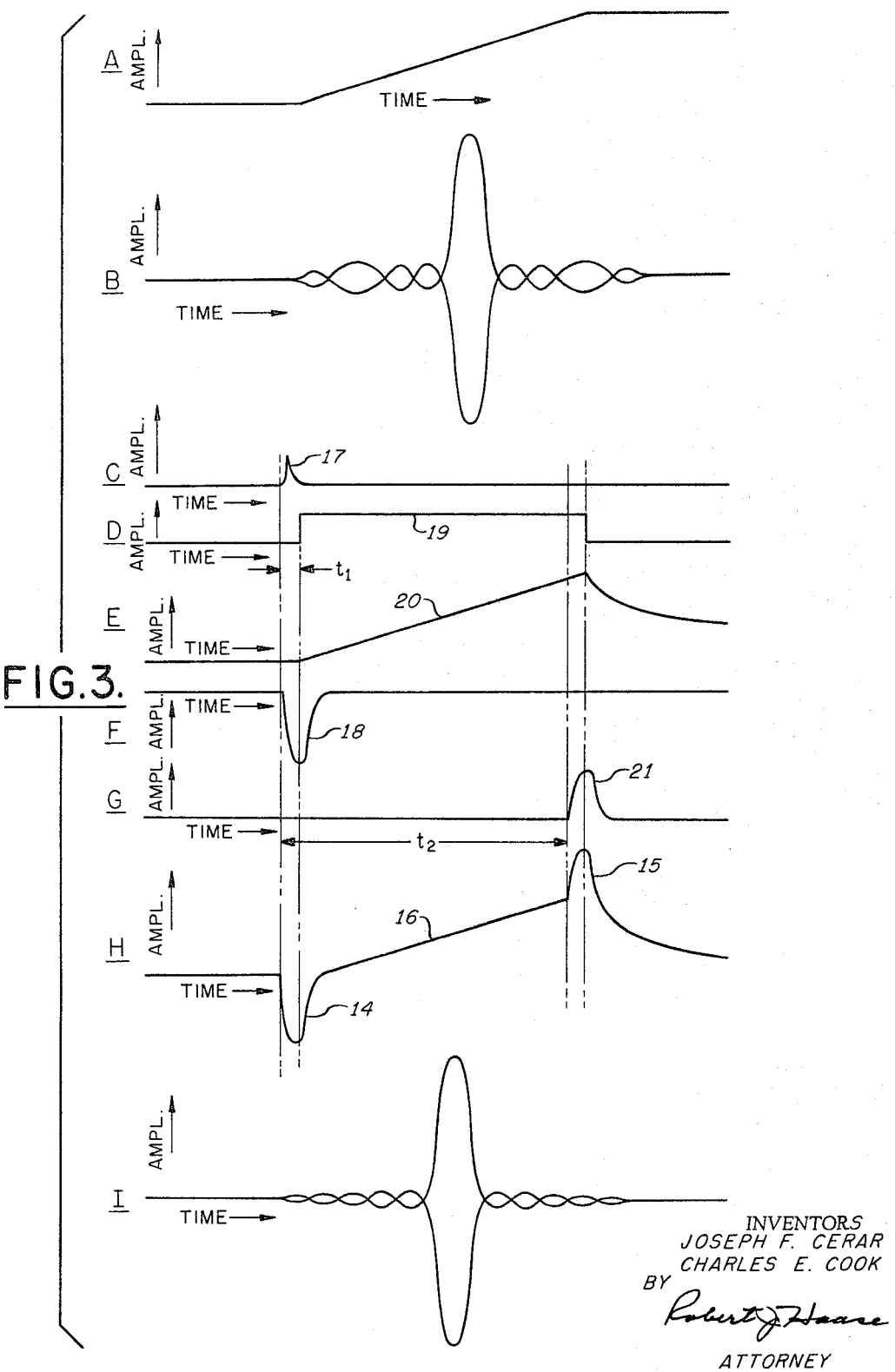

3,281,842
ELECTRONIC MEANS FOR SUPPRESSING RANGE SIDE LOBES OF A COMPRESSED PULSE SIGNAL
Joseph F. Cerar, Plainview, and Charles E. Cook, Farmingdale, N.Y., assignors to Sperry Rand Corporation, Great Neck, N.Y., a corporation of Delaware
Filed Jan. 16, 1963, Ser. No. 251,937
11 Claims. (Cl. 343—17.2)

The present invention generally relates to pulse compression systems such as, for example, pulse compression radar systems. More particularly, the invention is concerned with means for suppressing the "range side lobes" of the compressed pulse produced in systems of the aforementioned kind.

Pulse compression systems of the radar type are well known in the art. One example of a pulse compression radar is shown in U.S. Patent 2,624,876, issued to R. H. Dicke on January 6, 1953. According to said patent, a a relatively long duration, low amplitude frequency-swept pulse is transmitted toward a reflecting object. The reflected signal received from said object is processed in a specially designed filter network located in the radar receiver. The network is characterized by a signal time delay versus frequency transfer function complementary to the time order of occurrences of the different frequency components of the transmitted signal. As a result, the relatively long time duration, low amplitude signal recieved from the reflecting object is converted into a relatively short time duration, high amplitude compressed pulse. The pulse compressing technique permits increased target range discrimination at greater target ranges without exceeding transmitted power peak limitations, as is well understood in the art.

Examining the nature of the compressed pulse in greater detail, one finds that a plurality of relative low amplitude pulses are produced about the base of a single relatively high amplitude pulse which is the sole desired component of the composite waveform at the output of the radar recieiver compression filter. By analogy with the familiar spacial side lobes of a directional antenna radiation pattern, the relatively low amplitude pulses which precede and follow in time sequence the single desired high amplitude pulse are termed the "range side lobes" of a compressed pulse signal. A figure of merit of the compresses pulse signal is defined by the amplitude ratio between the desired high amplitude pulse and the range side lobes. The greater the ratio, the less ambiguity in determining the range of a specific reflecting object when other reflecting objects are located in the same vicinity.

Attention has been directed to the need for minimizing the amplitudes of the range side lobe components of a compressed pulse signal. The problem is described in the paper entitled "The Theory and Design of Chrip Radars" by J. R. Klauder et al. in the July 1960 issue of the Bell System Technical Journal beginning on page 745. More particularly, a transversal filter (tapped delay line) technique is mentioned for aiding in the reduction of range side lobe amplitudes by producing delayed versions of the compressed wave train at the ontput of the radar receiver compression filter. The delayed and undelayed compressed wave trains are combined in proper phase relationship to reduce the levels of the undesired range side lobe components without seriously detracting from the desired high amplitude and short time duration of the main component of the compressed pulse wave train. Thus, the minimization of the range side lobes is achieved by the interfering combination of a plurality of time displaced signals of the same frequency content. It should be noted, however, that the transversal filter required by the described technique poses a design problem substantially as formidable as those attending the design of the pulse compression filter network itself.

It is a principal object of the present invention to provide active electronic means for minimizing the range side lobe components of a compressed pulse signal.

Another object is to produce a plurality of sideband frequency displaced replicas of a transmitted frequency swept pulse spectrum for the reduction of the range side lobe response of a pulse compression filter receiving said spectrum and said side-band replicas.

An additional object is to provide means for deliberately phase distorting the transmitted frequency swept pulse of a pulse compression radar for minimizing the range side lobe response of the radar receiver compression filter.

Another object is to provide simple, easily adjusted means for angle modulating the signal transmitted by a pulse compression radar so as to minimize the range side lobe components at the output of the radar receiver pulse compression filter.

These and other objects of the present invention, as will appear from a reading of the following specification, are achieved in an illustrative embodiment of a pulse compression radar by the provision of means for angle modulating (phase or frequency modulating) the transmitted linearly frequency swept pulse spectrum with a multiplicity of phase locked sinusoidal signals. Each of the sinusoidal signals produces a respective plurality of side-band replica pairs of the basic linearly frequency swept pulse spectrum. By the properly phasing of each of the sinusoidal modulating signals and, hence, the phasing of the carriers of the respective sideband replica signals, a substantial reduction in the amplitudes of range side lobe signals is achieved at the output of the radar receiver pulse compression filter. The required multiplicity of sinusoidal modulating signals may be produced conveniently in the form of an impulse of predetermined shape. An impulse of approximately triangular shape has been found to be useful in this connection.

In one embodiment species of the invention, approximately triangular impulses are additively combined with a sawtooth waveform of lower slope and longer duration than those of the impulses. The combined impulses and sawtooth waveform determine the phase and frequency of a voltage controlled transmitter oscillator. The number of impulses which are added to the sawtooth waveform and the time position of the impulses relative to the sawtooth waveform may be set to achieve optimum range side lobe minimization in a particular pulse compression radar design.

In another embodiment of the invention, the linearly frequency swept pulse spectrum is phase modulated prior to the transmission with a multiplicity of phase locked sinusoidal signals without the use of a voltage controlled oscillator. More particularly, the linearly frequency swept pulse spectrum is produced by applying a pulsed oscillatory signal to a pulse expansion filter network in the manner disclosed in copending application S.N. 524,054, filed on July 25, 1955, in the names of Charles E. Cook and Charles E. Brockner and assigned to the present assignee. The frequency swept pulse spectrum at the output of the expansion network then is amplitude modulated by the impulse of approximately triangular shape. The amplitude modulated frequency swept spectrum is applied to a hard limiter wherein the amplitude modulation components are converted to phase modulation components to achieve essentially the same complex modulated signal which is produced at the output of the voltage controlled oscillator utilized in the first mentioned embodiment.

Figure 2:
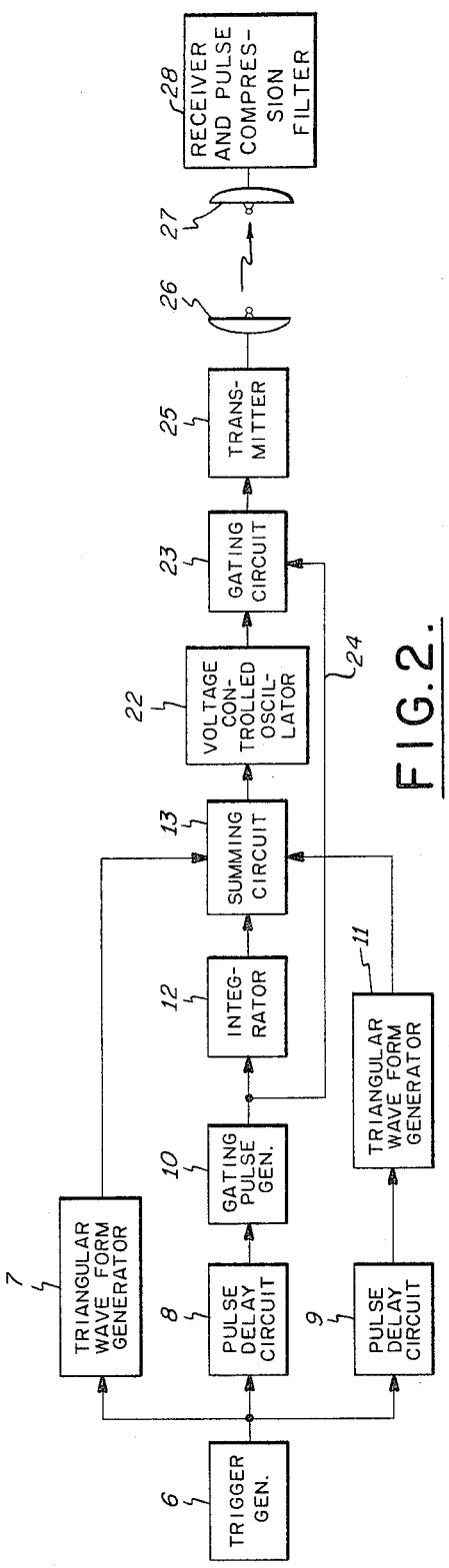
Figure 4:
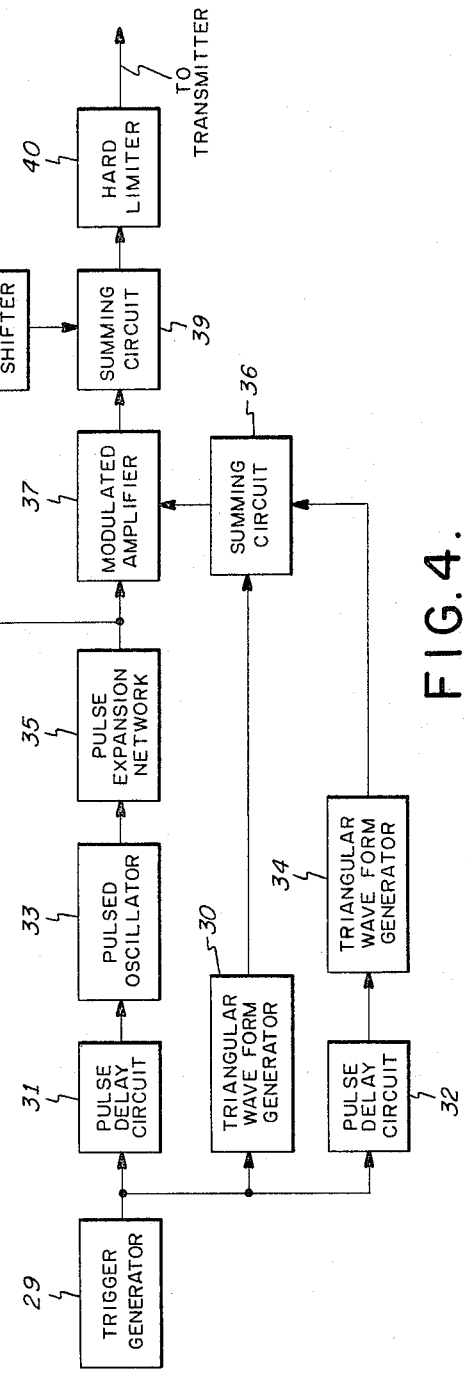

For a more complete understanding of the present invention, reference should be had to the following specification and the appended figures of which:

FIG. 1A–F is a series of waveforms useful in understanding the concepts underlying the present invention;

FIG. 2 is a simplified block diagram of an illustrative active pulse frequency modulator embodiment of the invention;

FIG. 3A–I is a series of waveforms exemplifying the operation of the embodiment of FIG. 2; and FIG. 4 is a simplified block diagram of a passive pulse frequency modulator embodiment alternative to the embodiment of FIG. 2.

An understanding of the concepts underlying the present invention will be facilitated by reference to the idealized waveforms of FIG. 1. It is assumed that a linearly frequency modulated signal represented by the frequency vs. time plot of waveform A is applied to a conventional pulse compression filter as described in the aforementioned Dicke patent. As is well understood, the frequency vs. time delay characteristics of the pulse compression filter is complementary to the frequency vs. time characteristic of the frequency swept signal which is applied to the filter. If, for example, the higher frequency components of the frequency swept signal occur later than the lower frequency components thereof, the compression filter will act to delay the higher frequency components by amounts which are less than the delay introduced in the lower frequency components. The result is that the input frequency swept signal is foreshortened or compressed by the filter into a wave train including one predominant pulse having an amplitude greater and a duration shorter than that of the input signal.

The compressed pulse wave train, represented by FIG. 1B, includes a number of "range side lobes" 1 symmetrically disposed about a predominant center pulse 2. The side lobe amplitudes generally diminish in directions away from said center pulse. The purpose of the present invention is to suppress the amplitudes of the side lobes relative to the amplitude of center pulse 2 thereby to increase the detectability of the center pulse.

It can be shown that when a carrier wave is phase or frequency modulated in sinusoidal fashion, the resulting modulated signal contains frequency components analogous to the carrier frequency and sideband components of an amplitude modulated wave. The frequencies of the resulting sideband components are separated by integral multiples of the modulation rate. Thus, the first order sidebands of the phase or frequency modulated signal correspond to the sidebands of an amplitude modulated signal. Unlike the amplitude modulated signal, however, the phase or frequency modulated signal also includes higher order sideband components having amplitudes depending upon the modulation index.

The frequency separations between the different sideband components of the modulated signal, when acted upon by the pulse compression filter, are converted into correspondingly different time delays so as to produce at the output of the pulse compression filter a series of sideband "paired echos."

The paired echos resulting from a single sinusoidal frequency modulating signal may be superimposed upon the range side lobes produced by a linear or sawtooth frequency modulating signal by combining and applying the sinusoidal and sawtooth modulating signals to the same voltage controlled oscillator and by processing the oscillator output signal through a pulse compression filter. The time positions of the paired echo signals may be varied relative to the time positions of the range side lobes by varying the frequency of the sinusoidal modulating signal. The carrier phase of the paired echo signals may be varied relative to the carrier phase of the range side lobes by varying the phase of sinusoidal modulating signal.

FIG. 1C represents the waveform resulting from the addition of a single sawtooth modulating signal and a single sinusoidal modulating signal. The waveform of FIG. 1D represents the compressed pulse train that was produced at the output of a linear pulse compression filter in response to the application of a signal frequency modulated by the composite waveform of FIG. 1C. The effect upon the compressed pulse train by the action of the sinusoidal modulating signal may be seen by comparing the compressed pulse trains of FIGS. 1B and 1D. It will be noted that whereas the range side lobes of FIG. 1B are symmetrically disposed about center pulse 2, the range side lobes 4 of FIG. 1D are greater in amplitude than the range side lobes 3 which are situated on the opposite side of center pulse 5. Another and more significant result in this example is that the range side lobes have been significantly reduced in amplitude relative to the corresponding range side lobes of FIG. 1B while side lobes 4 have been reduced in number relative to the corresponding side lobes of FIG. 1B.

The addition of the sinusoidal modulating signal to the sawtooth modulating signal produces interfering paired echos and range side lobes which diminish the amplitude of the resultant range side lobes relative to the case where only a sawtooth modulating signal is employed. It is interesting to observe that if the phase of the single sinusoidal modulating signal is reversed, the effect upon the residual side lobes is also reversed. This may be seen by comparing the composite modulating waveforms of FIGS. 1C and 1E and the corresponding compressed pulse trains of FIGS. 1D and 1F. The sinusoidal modulating signal component of FIG. 1E is phase reversed relative to the sinusoidal modulating signal component of FIG. 1C.

The side lobe suppression achieved by the introduction of a single sinusoidal modulating signal produces a useful degree of side lobe suppression. However, it has been found that the addition of a multiplicity of sinusoidal modulating signals to the basic sawtooth modulating waveform produces a cumulative side lobe suppression effect which further increases the amplitude ratio between the predominant center pulse and all of the residual side lobes. It has also been observed that the frequencies of the multiplicity of sinusoidal signals and the phases of the sinusoidal signals (relative to the start of the basic sawtooth component) must be determined in a special manner to achieve optimum side lobe suppression. An arbitrary number of sinusoidal modulating signals of arbitrary frequencies and phases actually may worsen the center pulse to side lobe amplitude ratio relative to the original case such as depicted in FIG. 1B wherein only the sawtooth modulating signal of FIG. 1A is utilized.

Once the frequency and phase relationships between the multiplicity of sinusoidal modulating signals have been determined for a given compression filter design to achieve optimum compression, the problem arises as to how the required sinusoidal modulating signals may be generated. It is impractical, of course, to provide a corresponding multiplicity of sinusoidal signal generators each having its own phase locking means. Instead, it is preferred that the desired phase locked multiplicity of sinusoidal modulating signals be produced as components of a single impulse function which impulse function may be readily produced by relatively simple circuit elements.

It will be appreciated that the combination of phase locked sinusoidal modulating signals required for optimum side lobe suppression depends in part upon the frequency vs. time delay characteristic of the pulse compression filter to be employed. As a practical matter, however, it has been found that the pulse compression filter described in the aforementioned Dicke patent, namely a filter having a substantially linear frequency vs. time delay characteristic, is the easiest to instrument. Thus, the problem to be solved reduces to the problem of generating those phase locked sinusoidal modulating signals which when added to a substantially sawtooth modulating signal will produce a complex angle modulated signal which, when applied to a substantially linear pulse compression filter, will produce a single compressed output pulse having negligible range side lobes.

In accordance with the present invention, means are provided for generating one or more impulses of approximately triangular wave shape for addition to the basic sawtooth modulating signal component. It has been established that the addition of a single triangular impulse affords a significant reduction of side lobe amplitudes and that further reduction can be achieved through the use of one or more additional impulses at certain time positions relative to the start of the basic sawtooth modulating signal component. In one instance, it has been found that the addition of two triangular impulses at the start and end, respectively, of the basic sawtooth modulating component achieves a high order of side lobe suppression. This is depicted in the waveforms of FIG. 3 which will be described in connection with the embodiment of FIG. 2. FIG. 2 is an illustrative embodiment of the present invention adapted for use in a pulse compression radar. Trigger generator 6 provides a train of pulses establishing the pulse repetition rate of the pulse compression radar system. Said pulses are jointly applied to triangular waveform generator 7 and pulse delay circuits 8 and 9. Circuits 8 and 9 respectively trigger gating pulse generator 10 and triangular waveform generator 11. A simple and suitable instrumentation for each of generators 7 and 11 comprises a rectangular pulse generator followed by a pulse integrating circuit, the latter of which might be an ordinary resistance-capacitive network. Gating pulse generator 10 may be an ordinary monostable multivibrator producing a rectangular output pulse having a leading edge coincident with the delayed trigger from circuit 8 and a trailing edge occurring a fixed time later. The rectangular output pulse is applied to integrator 12 to produce a triangular waveform having a substantially linear sawtooth portion in a conventional manner.

As previously mentioned, the addition of a triangular impulse to the sawtooth modulating frequency waveform produces a significant reduction in the amplitudes of the range side lobes of the compressed pulse signal. Further reduction in the amplitudes of the range side lobes can be achieved through the use of one or more additional triangular impulses to the basic sawtooth frequency modulating waveform at certain time positions relative to the basic sawtooth waveform. In the illustrative case of the composite frequency modulating waveform represented in FIG. 3H two triangular impulses 14 and 15 have been added to the basic sawtooth frequency modulating waveform 16.

The trigger pulse 17 of FIG. 3C is produced by generator 6 and triggers generator 7 to produce the negative-going triangular pulse 18 of FIG. 3F. Pulse 17 is delayed by an amount $t_1$ in circuit 8 and then triggers generator 10 to produce the positive-going rectangular waveform 19 of FIG. 3D. Waveform 19 is operated upon by integrator 12 to yield the substantially linear phase-locked waveform 20 of FIG. 3E. Pulse 17 is delayed an amount $t_2$ in circuit 9 and then triggers generator 11 to produce the positive-going triangular waveforms 21 of FIG. 3G. Waveforms 18, 20 and 21 are additively combined in summing circuit 13 to produce the composite frequency modulating waveform of FIG. 3H. It should be noted that all of the frequency modulating waveform components 18, 20 and 21 are phase-locked relative to each other through the synchronizing action of the triggers produced by generator 6.

The composite frequency modulating waveform of FIG. 3H is applied to voltage controlled oscillator 22. Oscillator 22 may comprise a carrier reactance tube and oscillator combination whereby the frequency of the oscillator is determined in accordance with the amplitude of the signal waveform (FIG. 3H) which is applied to the reactance tube. The complex angle modulating carrier signal at the output of oscillator 22 is applied to gating circuit 23 which is rendered conductive during the occurrence of the positive-going portion of the waveform of FIG. 3D applied via line 24. The gated and modulated carrier signal at the output of circuit 23 is applied to the usual components generally represented by transmitter 25 and is radiated via antenna 26.

In a typical pulse compression radar application, the signal radiated via antenna 26 is intercepted by a remote object and reflected back towards the pulse compression receiver. The receiver may share the same antenna as transmitter 25 when the usual T-R components are provided. Alternatively and especially in pulse communication systems, the receiver and transmitter may be connected to respective receiving and transmitting antennas, such as antennas 26 and 27 of FIG. 2.

Receiver and pulse compression filter 28 includes a conventional linear pulse compression filter, i.e., a filter having a linear signal time delay vs. frequency characteristic. Inasmuch as the sense of the frequency sweep of the transmitted signal under discussion in connection with the typical embodiment of FIG. 2 increases with time, the receiver compression filter must be arranged to delay higher frequency components by amounts less than the time delay introduced into lower frequency components, as is well-known in the art. It will be recognized, of course, that the sense of the frequency sweep of the transmitted signal may be inverted with the lower frequency components of the transmitted signal occurring later than the higher frequency components. In the latter case, it is only necessary to arrange the receiver compression filter to have a complementary time delay vs. frequency characteristic with lower frequency components being delayed by amounts less than the higher frequency components to produce the desired compressed pulse in the receiver.

Receiver and pulse compression filter 28 preferably also includes a bandpass filter of specific frequency response, such as the Taylor weighting network disclosed in the aforementioned paper by Klauder et al., connected to the output of the compression filter. Said bandpass filter achieves a certain degree of range side lobe suppression. This may be seen by comparing the compressed pulses of FIG. 3B with the compressed pulses of FIG. 1B, the latter of which is produced by applying a simple linearly frequency modulated carrier signal to a conventional linear pulse compression filter. The compressed pulses of FIG. 3B, on the other hand, results from the application of a simple linearly frequency modulated carrier signal to a conventional linear compression filter connected in tandem with a bandpass filter such as the aforementioned Taylor weighting network. It has been proposed that a transversal filter be added to the output of the bandpass filter to yield even lower side lobe levels. The present invention is directed toward the realization of the same lower side lobe levels without the use of a transversal filter. Typical levels of range side lobes that may be realized with the present invention are one percent or less of the amplitude of the predominant pulse.

It has been found that if the conventional frequency modulating signal of FIG. 3A is applied to voltage controlled oscillator 22, then the compressed pulse train of FIG. 3B would be produced at the output of the bandpass filter connected in tandem with receiver and pulse compression filter 28. Simply by driving voltage controlled oscillator 22 with the waveform of FIG. 3H rather than with the simple sawtooth waveform of FIG. 3A, the compressed pulsed train of FIG. 3I is produced at the output of said bandpass filter. The marked additional reduction in the amplitudes of the range side lobes of the compressed pulse train 3I relative to the side lobe amplitudes of the compressed pulse train of FIG. 3B is achieved merely by introducing pulse delay circuits 8 and 9, triangular waveform generators 7 and 11 and summing circuit 13. Each of the introduced components is a relatively simple and reliable conventional circuit which adds no significant complexity to a pulse compression radar system.

The pulse compression embodiment represented in FIG. 2 involves the use of an active frequency modulated signal source within the transmitter. The active source includes the frequency modulating components 7–13 and the voltage controlled oscillator 22. As set forth in the aforementioned copending application S.N. 524,054, it is not necessary that active frequency modulating signal sources be provided. Alternatively, the required frequency swept transmitted pulse may be produced by the so-called "passive" technique of applying a pulsed signal to a pulse expansion filter network having a monotonic signal delay vs. frequency characteristic which "expands" the input pulsed signal by delaying the different frequency components thereof by amounts related to their frequencies. The embodiment depicted in FIG. 4 is directed to the described passive frequency modulating technique.

Referring to FIG. 4, trigger generator 29 produces a series of output pulses establishing the radar repetition interval. The pulses are jointly applied to triangular waveform generator 30 and to pulse delay circuits 31 and 32. The delayed pulses from circuits 31 and 32 respectively trigger pulsed oscillator 33 and triangular waveform generator 34. The pulsed oscillations produced by oscillator 33 are applied to pulse expansion network 35 to generate at the output thereof a substantially linearly frequency swept carrier signal in response to each of the triggers at the output of circuit 31. If the teachings of copending application 524,054 were followed, the linearly frequency swept carrier signal would be transmitted without further modulation and would produce in the receiver substantially the same compressed pulse wave train having appreciable range side lobes discussed in connection with FIG. 3B.

Although there is no voltage controlled oscillator in the embodiment of FIG. 4, conventional angle modulating techniques may be employed to introduce the range side lobe corrective modulation into the transmitted signal. In particular, the linearly frequency swept carrier signal at the output of network 35 is phase modulated by each of the triangular impulses produced by triangular waveform generators 30 and 34 by means of summing circuit 36, modulated amplifier 37, 90° phase shift network 38, summing circuit 39 and hard limiter 40. The phase modulating components are connected in a typical arrangement such as described beginning on page 582 of Terman's "Radio Engineer's Handbook," McGraw-Hill, 1943. Briefly, each triangular side lobe corrective waveform from generators 30 and 34 amplitude modulates in amplifier 37 the linearly frequency swept carrier signal at the output of network 35. The amplitude modulated and frequency swept signal is combined in network 39 with a phase shifted portion of the linearly frequency swept signal. The amplitude modulation components are converted into phase modulation components in hard limiter 40 to produce a complex angle modulated wave substantially the same as the angle modulated wave produced at the output of voltage controlled oscillator 22 in the embodiment of FIG. 2.

It can be seen from the preceding specification that the objects of the present invention have been achieved by the provision of means for angle-modulating a linearly frequency swept carrier signal with a plurality of phase locked sinusoidal signals. The required angle modulation can be accomplished either by the use of active means including a voltage controlled oscillator or through the use of passive means including a pulse expansion filter network. In either event, a complex angle modulated frequency swept signal of relatively low amplitude and long duration is produced. The transmitted signal may be compressed into a relatively high amplitude and short duration predominant pulse having greatly reduced range side lobes in a conventional linear pulse compression receiver. The enhanced response of the pulse compression receiver is achieved without resort to difficult transversal filter design techniques but rather by the introduction of relatively few, simple and reliable waveform generators whose combined phase locked sinusoidal signals angle modulate the transmitted frequency swept signal. In the preferred embodiment, the phase locked sinusoidal signals are produced as components of one or more triangular waveform pulses. The position of the triangular pulses, relative to the basic sawtooth frequency modulating signal, may be different for specific designs of pulse compression systems to optimize the reduction of the range side lobes of the compressed pulse train produced at the output of the compression filter.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A transmitter for suppressing range side lobes in the receiver of a pulse compression system,
    said receiver having a filter possessing a signal time delay versus frequency characteristic whereby received signal components are delayed by amounts related to the frequencies thereof,
    said transmitter comprising a source of frequency swept carrier oscillations, the sense of the carrier frequency sweep being opposite to the sense of said receiver characteristic,
    a source of sinusoidal modulating signal,
    and means for angle modulating said carrier oscillations with said sinusoidal modulating signal.

2. A transmitter for suppressing range side lobes in the receiver of a pulse compression system,
    said receiver having a filter possessing a linear signal time delay versus frequency characteristic whereby received signal components are delayed by amounts linearly related to the frequencies thereof,
    said transmitter comprising a source of linearly frequency swept carrier oscillations, the sense of the carrier frequency sweep being opposite to the sense of said receiver characteristic,
    a source of sinusoidal modulating signal,
    and means for angle modulating said carrier oscillations with said sinusoidal modulating signal.

3. A transmitter for suppressing range side lobes in the receiver of a pulse compression system,
    said receiver having a filter possessing a linear signal time delay versus frequency characteristic whereby received signal components are delayed by amounts linearly related to the frequencies thereof,
    said transmitter comprising a source of linearly frequency swept carrier oscillations, the sense of the carrier frequency sweep being opposite to the sense of said receiver characteristic,
    a source of phase locked sinusoidal modulating signals,
    and means for angle modulating said carrier oscillations with said sinusoidal modulating signals.

4. A transmitter for suppressing range side lobes in the receiver of a pulse compression system,
    said receiver having a filter possessing a linear signal time delay versus frequency characteristic whereby received signal components are delayed by amounts linearly related to the frequencies thereof,
    said transmitter comprising a source of controllable frequency carrier oscillations,
    a first generator for producing a sawtooth signal,
    a second generator for producing a sinusoidal signal,
    and means for additively combining said sawtooth and said sinusoidal signals to produce a frequency control signal,
    said control signal being applied to said source.

5. A transmitter for suppressing range side lobes in the receiver of a pulse compression system, said receiver having a filter possessing a linear signal time delay versus frequency characteristic whereby received signal components are delayed by amounts linearly related to the frequencies thereof,
said transmitter comprising a source of controllable frequency carrier oscillations,
a first generator for producing a sawtooth signal,
a second generator for producing phase-locked sinusoidal modulating signals,
and means for additively combining said sawtooth and phase-locked signals to produce a frequency control signal,
said control signal being applied to said source.

6. A transmitter for suppressing range side lobes in the receiver of a pulse compression system,
said receiver having a filter possessing a linear signal time delay versus frequency characteristic whereby received signal components are delayed by amounts linearly related to the frequencies thereof,
a source of controllable frequency carrier oscillations,
a first triggerable generator for producing a sawtooth signal,
a second triggerable generator for producing a sinusoidal signal,
means for coherently triggering said first and second generators,
and means for additively combining said sawtooth and sinusoidal signals to produce a frequency control signal,
said control signal being applied to said source.

7. A transmitter for suppressing range side lobes in the receiver of a pulse compression system,
said receiver having a filter possessing a linear time delay versus frequency characteristic whereby received signal components are delayed by amounts linearly related to the frequencies thereof,
said transmitter comprising a source of controllable frequency carrier oscillations,
a first triggerable generator for producing a sawtooth signal,
a second triggerable generator for producing phase-locked sinusoidal signals,
means for coherently triggering said first and second generators,
and means for additively combining said sawtooth and phase-locked sinusoidal signals to produce a frequency control signal,
said control signal being applied to said source.

8. A transmitter for suppressing range side lobes in the receiver of a pulse compression system,
said receiver having a filter possessing a linear time delay versus frequency characteristic whereby received signal components are delayed by amounts linearly related to the frequencies thereof,
said transmitter comprising a source of controllable frequency carrier oscillations,
a first generator for producing a sawtooth-shaped signal,
a second generator for producing a substantially triangle-shaped signal,
and means for additively combining said sawtooth and substantially triangle-shaped signals to produce a frequency control signal,
said control signal being applied to said source.

9. A transmitter for suppressing range side lobes in the receiver of a pulse compression system,
said receiver having a filter possessing a linear signal time delay versus frequency characteristic whereby received signal components are delayed by amounts linearly related to the frequencies thereof,
said transmitter comprising a source of controllable frequency carrier oscillations,
a first triggerable generator for producing a sawtooth-shaped signal,
a second triggerable generator for producing a substantially triangle-shaped signal,
means for coherently triggering said first and second generators,
and means for additively combining said sawtooth and substantially triangle-shaped signals to produce a frequency control signal,
said control signal being applied to said source.

10. A transmitter for suppressing range side lobes in the receiver of a pulse compression system,
said receiver having a filter possessing a linear signal time delay versus frequency characteristic whereby received signal components are delayed by amounts linearly related to the frequencies thereof,
said transmitter comprising a triggerable source of pulsed carrier oscillations,
a pulse expansion network coupled to receive said carrier oscillations for linearly frequency sweeping said oscillations in a sense opposite to the sense of said receiver characteristic,
a triggerable generator for producing a substantially triangle-shaped signal,
means for coherently triggering said source and said generator,
and means for angle modulating the linearly frequency swept oscillations with said substantially triangle-shaped signal.

11. A transmitter for suppressing range side lobes in the receiver of a pulse compression system,
said receiver having a filter possessing a linear signal time delay versus frequency characteristic whereby received signal components are delayed by amounts linearly related to the frequencies thereof,
said transmitter comprising a triggerable source of pulsed carrier oscillations,
a pulse expansion network coupled to receive said carrier oscillations for linearly frequency sweeping said oscillations in a sense opposite to the sense of said receiver characteristic,
a triggerable generator for producing a plurality of time displaced substantially triangle-shaped signals,
means for coherently triggering said source and said generator,
means for additively combining said substantially triangle-shaped signals to produce a modulating signal,
and means for angle modulating the linearly frequency swept oscillations with said substantially triangle-shaped signals.

References Cited by the Examiner
UNITED STATES PATENTS
2,692,330  10/1954  Kahn _____ 325—65 X
FOREIGN PATENTS
1,001,978  8/1965  Great Britain.
OTHER REFERENCES
Temes, C. L., Sidelobe Suppression in a Range-Channel Pulse-Compression Radar, IRE Transactions on Military Electronics, April 1962, pages 162–173.

DAVID G. REDINBAUGH, *Primary Examiner.*
J. T. STRATMAN, *Assistant Examiner.*